F. A. WENNERSTROM.
ECCENTRIC CHUCK.
APPLICATION FILED SEPT. 28, 1912.

1,056,476.

Patented Mar. 18, 1913.

2 SHEETS—SHEET 1.

Witnesses

Inventor
Fred A. Wennerstrom
By Luther V. Moulton
Attorney

UNITED STATES PATENT OFFICE.

FREDERICK A. WENNERSTROM, OF GRAND RAPIDS, MICHIGAN.

ECCENTRIC CHUCK.

1,056,476.  Specification of Letters Patent.  Patented Mar. 18, 1913.

Application filed September 28, 1912.  Serial No. 722,808.

*To all whom it may concern:*

Be it known that I, FREDERICK A. WENNERSTROM, a citizen of the United States of America, residing at Grand Rapids, in the county of Kent and State of Michigan, have invented certain new and useful Improvements in Eccentric-Chucks; and I do hereby declare the following to be a full, clear, and exact description of the invention, such as will enable others skilled in the art to which it appertains to make and use the same.

My invention relates to improvements in eccentric chucks, and its object is to provide the same with various new and useful features hereinafter more fully described, and particularly pointed out in the claims.

Figure 1:
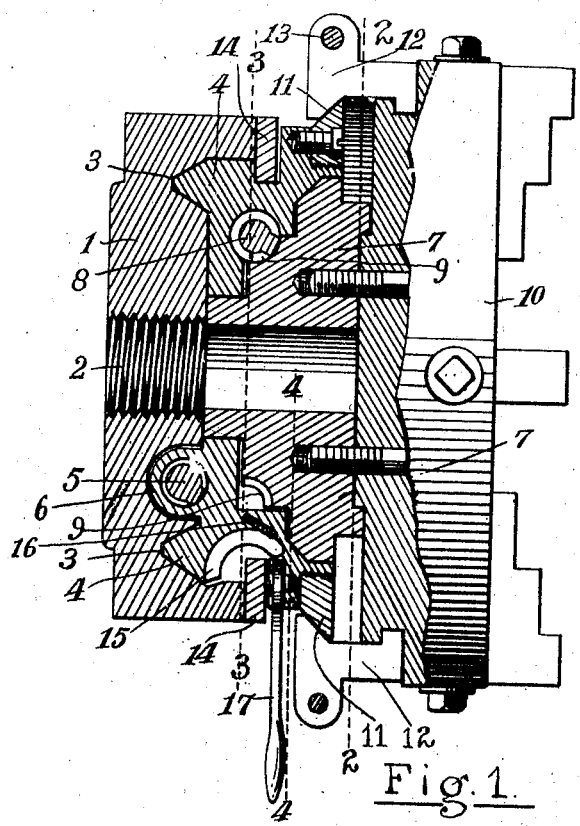
Figure 5:
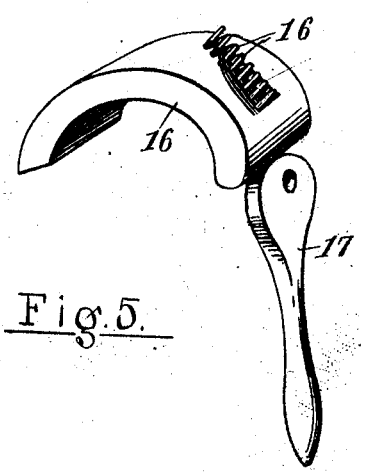
Figure 4:
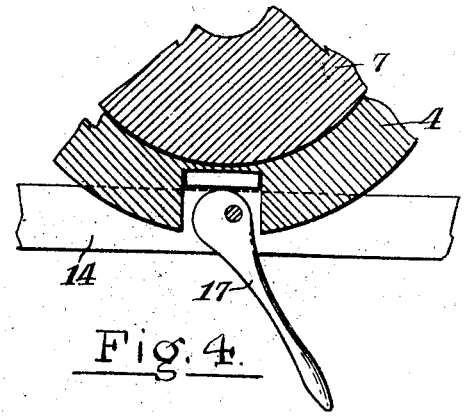
Figure 2:
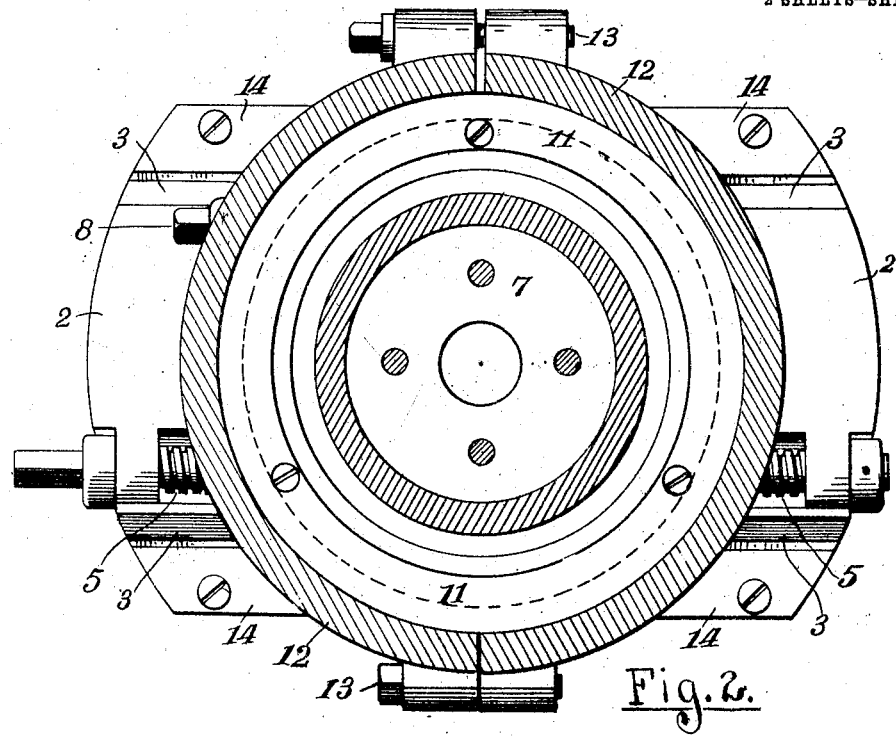
Figure 3:
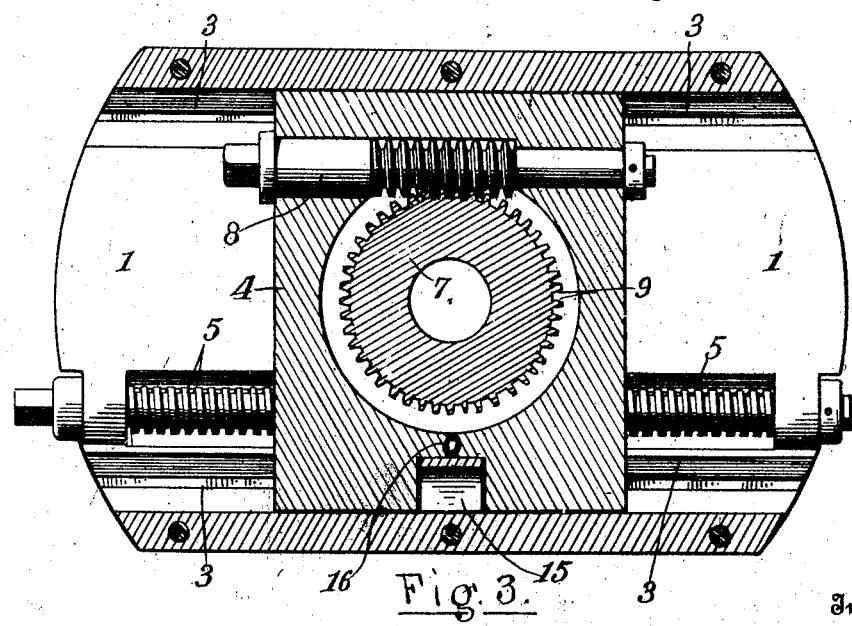

My invention consists essentially of a bed plate adapted to be mounted on a lathe spindle and provided with transverse ways, a carriage slidable in the ways, a screw to adjust the carriage, locking means to secure the carriage in place, a rotative holder mounted on the carriage, a screw to rotate the same, a chuck mounted on the rotative holder and a clamping band to hold said holder and chuck securely and rigidly in adjusted position, and in various details of construction and arrangement, as will more fully appear by reference to the accompanying drawings, in which:

Figure 1 is a side elevation of a device embodying my invention broken away to show a vertical section of the main features of the device. Fig. 2 is a vertical transverse section on the line 2—2 of Fig. 1. Fig. 3 is the same on the line 3—3 of Fig. 1. Fig. 4 is a detail at right angles to Fig. 1 of the locking means for the carriage. Fig. 5 is a perspective detail of a portion of the same on an enlarged scale.

Like numbers refer to like parts in all of the figures.

1 represents a bed plate having a central opening 2 to receive the screw threaded end of a lathe spindle, whereby the bed plate is mounted on the same.

3 are parallel grooves in the bed plate spaced apart and extending in a plane at right angles to the axis of rotation of the device.

4 is a carriage mounted on the bed plate 1 and having tongues to slidably fit the grooves 3.

5 is a screw mounted on the bed plate 2 and extending through a screw threaded lug 6 in the carriage; whereby the carriage is adjusted on the bed plate transversely of the axis of rotation. To retain the carriage in place on the bed plate, strips 14 are secured to the bed plate and extend inward into grooves in the opposite sides of the carriage and opposite the ways of the same.

To lock the carriage in adjusted position a locking segment 15 is provided which is substantially semi-circular in form and slidable in a semi-circular recess in the carriage. One end of this segment projects outside of the retaining strip 14 and is engaged by a cam lever 17 pivoted on the carriage whereby this end of the segment is forced inward and the other end of the same moved outward, due to its semi-circular form. The outwardly movable end is adapted to engage an under-cut channel in the bed plate along the outer side of the groove 3 therein. This segment when engaged by the cam lever will be forced against the bottom of the under-cut channel and will crowd the tongue into the groove, and thus securely and rigidly hold the carriage in place. Rotative in the carriage is a chuck carrier 7, on which the chuck 10 is mounted. This carrier is provided with a worm gear 9 engaged by a screw 8 mounted in the carriage whereby the carrier may be rotatively adjusted.

To securely lock the carrier and chuck in adjusted position the carriage is provided with a conical surface 11. Attached to the chuck is a clamping band 12 divided at opposite sides and provided with binding screws 13, and secured to the chuck by a circumferential tongue and groove, and having an over-hanging portion surrounding and engaging the conical surface 11 whereby as the band is tightened it draws the chuck and carrier firmly against the carriage and securely holds the same in adjustment.

By means of the locking means described the carriage is rigidly held in place by the locking segment, and by means of the clamping band and conical seat for the same the carrier and chuck are also rigidly held, the result being that while the chuck is adjustable transversely to the axis of rotation and also adjustable about its own axis it is also rigidly held to effectively perform its function of holding the work.

What I claim is:

1. An eccentric chuck, comprising a bed plate, a carriage slidable on the bed plate, a carrier rotative on the carriage, a chuck mounted on the carrier, means for adjusting the carriage, means for rotating the carrier, means for locking the carriage on the bed plate, and means for locking the holder and chuck in place on the carriage.

2. An eccentric chuck, comprising a bed plate adapted to be mounted on a lathe spindle, and having parallel grooves, a carriage having tongues slidable in the grooves, an under-cut channel in the bed plate, a segment slidable in a curved recess in the carriage and having one end to enter said under-cut groove, a cam lever mounted on the carriage to engage the other end of the segment and lock the carriage in place, and means for adjusting the carriage on the bed plate.

3. An eccentric chuck, comprising a bed plate adapted to be mounted on a lathe spindle and having parallel V grooves, a carriage mounted on the bed plate and having tongues slidable in the grooves; said bed plate also having an under-cut channel adjacent to one of the grooves, a substantially semi-circular segment slidable in a concave recess in the carriage, one end of which segment enters the under-cut groove, and a cam lever engaging the other end of the segment to force the same into the groove.

4. An eccentric chuck, comprising a bed plate, a carriage adjustable on the bed plate, means for locking the carriage, a carrier rotative in the carriage and having a worm gear a screw engaging the gear to rotate the carrier, a chuck mounted on the holder, a clamping band attached to the chuck and engaging the carriage to lock the carrier in place.

5. An eccentric chuck, comprising a bed plate, a carriage adjustable on the bed plate, means for locking the carriage in place, a carrier rotative in the carriage, a conical bearing surface on the carriage, a chuck mounted on the carriage and a clamping band attached to the chuck and having an inclined surface engaging the said conical surface to clamp the carrier and chuck in place on the carriage.

6. An eccentric chuck, comprising a bed plate having parallel ways, a carriage slidable in the ways, a substantially semi-circular segment slidable in a concave recess in the carriage and having one end engaging the bed plate, and means for forcing the other end of the segment inward, whereby the carriage is clamped in place by the segment.

7. An eccentric chuck, comprising a bed plate, a carriage adjustable on the bed plate, a carrier rotative in the carriage, means for adjusting the carriage and the carrier, a conical surface on the carriage surrounding the carrier, a chuck mounted on the carrier and a clamping band divided into two equal parts and connected by binding screws; said band having tongue and groove connection with the chuck, and also having a conical surface engaging the conical surface on the carriage, to clamp the chuck and carrier in place.

In testimony whereof I affix my signature in presence of two witnesses.

FREDERICK A. WENNERSTROM.

Witnesses:
HAROLD O. VAN ANTWERP,
LUTHER V. MOULTON.

Copies of this patent may be obtained for five cents each, by addressing the "Commissioner of Patents, Washington, D. C."